(12) United States Patent
Donaldson (10) Patent No.: US 11,794,240 B2
(45) Date of Patent: Oct. 24, 2023

(54) POWDER METAL ALLOY COMPOSITION FOR SINTERED POWDER METAL INSERT FOR ALUMINUM CASTING

(71) Applicant: GKN Sinter Metals, LLC, Auburn Hills, MI (US)

(72) Inventor: Ian W. Donaldson, Madison, NH (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 341 days.

(21) Appl. No.: 16/768,477

(22) PCT Filed: Nov. 19, 2018

(86) PCT No.: PCT/US2018/061809
§ 371 (c)(1),
(2) Date: May 29, 2020

(87) PCT Pub. No.: WO2019/108430
PCT Pub. Date: Jun. 6, 2019

(65) Prior Publication Data
US 2021/0170478 A1 Jun. 10, 2021

Related U.S. Application Data

(60) Provisional application No. 62/592,814, filed on Nov. 30, 2017.

(51) Int. Cl.
*B22D 19/00* (2006.01)
*B22D 19/04* (2006.01)
(Continued)

(52) U.S. Cl.
CPC ......... *B22D 19/0009* (2013.01); *B22D 19/04* (2013.01); *B22F 5/008* (2013.01);
(Continued)

(58) Field of Classification Search
CPC ..... B22D 19/0009; B22D 19/04; B22F 5/008; B22F 7/08; B22F 2207/01; B22F 2301/35;
(Continued)

(56) References Cited

U.S. PATENT DOCUMENTS

| 4,008,051 A | 2/1977 | Cadle |
| 2004/0112173 A1 | 6/2004 | Maulik |

(Continued)

FOREIGN PATENT DOCUMENTS

| CN | 101918162 A | 12/2010 |
| CN | 102655966 A | 9/2012 |

(Continued)

OTHER PUBLICATIONS

JP 2012-092399A Translation (Year: 2012).*

(Continued)

*Primary Examiner* — Brian D Walck
*Assistant Examiner* — Danielle Carda
(74) *Attorney, Agent, or Firm* — Quarles & Brady LLP (57) ABSTRACT

A powder metal alloy composition is used in the production of a sintered powder metal insert for casting into an aluminum casting. The powder metal alloy composition includes an iron powder metal base, copper such that the copper is 3.5 weight percent or more of the powder metal alloy composition, and carbon in an amount of 0.1 to 1.0 weight percent of the powder metal alloy composition. Upon compacting and sintering the powder metal alloy composition to form the sintered powder metal insert, the sintered powder metal insert has a copper gradient that provides a higher concentration of copper on the surface of the sintered powder metal insert than in a center of the grains of the sintered powder metal insert. The higher concentration of copper at the surface of the insert enables a strong metallurgical bond to be formed with the aluminum casting during casting.

15 Claims, 6 Drawing Sheets

(51) Int. Cl.
  *B22F 5/00* (2006.01)
  *B22F 7/08* (2006.01)
  *C22C 21/14* (2006.01)
  *C22C 21/16* (2006.01)
  *C22C 21/18* (2006.01)
  *C22C 38/16* (2006.01)
  *F16C 9/02* (2006.01)
  *F16C 33/14* (2006.01)

(52) U.S. Cl.
  CPC .............. *B22F 7/08* (2013.01); *C22C 21/14* (2013.01); *C22C 21/16* (2013.01); *C22C 21/18* (2013.01); *C22C 38/16* (2013.01); *F16C 9/02* (2013.01); *F16C 33/145* (2013.01); *B22F 2207/01* (2013.01); *B22F 2301/35* (2013.01); *F16C 2204/60* (2013.01); *F16C 2220/02* (2013.01); *F16C 2360/18* (2013.01)

(58) Field of Classification Search
  CPC ..... B22F 2998/10; C22C 21/14; C22C 21/16; C22C 21/18; C22C 38/16; C22C 33/02; F16C 9/02; F16C 33/145; F16C 2204/60; F16C 2220/02; F16C 2360/18; F16C 2220/20
  USPC ........................................................ 428/558
  See application file for complete search history.

(56) References Cited

U.S. PATENT DOCUMENTS

| | | |
|---|---|---|
| 2004/0182200 A1 | 9/2004 | Takiguchi et al. |
| 2006/0073064 A1 | 4/2006 | Yu |
| 2006/0180251 A1 | 8/2006 | Rivest |
| 2007/0077447 A1 | 4/2007 | Oda et al. |
| 2011/0000457 A1* | 1/2011 | Donaldson .............. F16C 7/023 123/197.3 |
| 2017/0349981 A1* | 12/2017 | Nakamura .............. C22C 38/00 |

FOREIGN PATENT DOCUMENTS

| | | | |
|---|---|---|---|
| GB | 2396624 A | 6/2004 | |
| JP | S60219436 A | 11/1985 | |
| JP | 2012092399 A | 5/2012 | |
| JP | 5999285 B1 * | 9/2016 | ............... B22F 1/00 |
| WO | 2003022490 A1 | 3/2003 | |
| WO | 2017002623 A1 | 1/2017 | |

OTHER PUBLICATIONS

Cheng, Proceedings of the 15th Meeting of Powder Metallurgy Technology Exchange of Five Provinces and One City in East China, Oct. 31, 2014, pp. 246-253 [No English Language Translation Available].

China National Intellectual Property Administration, First Office Action and Search Report, Application No. 201880077573.0, dated Jun. 21, 2021, 21 pages.

Qu, Powder Metallurgy Principle and Process, Metallurgical Industry Press, May 31, 2013, pp. 223-224 [No English Language Translation Available].

China National Intellectual Property Administration, Second Office Action and Search Report, Application No. 201880077573.0, dated Feb. 21, 2022, 23 pages.

International Searching Authority. International Search Report and Written Opinion for application PCT/US2018/061809. dated Apr. 29, 2019. 12 pages.

Japan Patent Office, Notification of Reasons for Refusal, Application No. 2020-529411, dated Aug. 2, 2022, 10 pages.

\* cited by examiner

FIG. 1

1S, 1% Cu prealloy & 2% admixed Cu, Beam 2% Nital/4% Picral

FIG. 2A 2S, 2% Cu prealloy & 1% admixed Cu, Beam 2% Nital/4% Picral

POWDER METAL ALLOY COMPOSITION FOR SINTERED POWDER METAL INSERT FOR ALUMINUM CASTING

CROSS-REFERENCE TO RELATED APPLICATION

This application represents the national stage entry of International Application No. PCT/US2018/061809 filed Nov. 19, 2018, and claims the benefit of the filing date of United States Provisional Patent Application No. 62/592,814 entitled "Powder Metal Alloy Composition for Sintered Powder Metal Insert for Aluminum Casting" filed on Nov. 30, 2017, which is hereby incorporated by reference for all purposes as if set forth in its entirety herein.

STATEMENT OF FEDERALLY SPONSORED RESEARCH OR DEVELOPMENT

Not applicable.

FIELD OF THE INVENTION

This disclosure relates to an improved ferrous powder metal alloy composition for forming a sintered powder metal insert for casting into an aluminum casting.

BACKGROUND

In a piston engine, camshafts are used to control the valves and crankshafts are connected to the pistons through connecting rods in order to turn linear motion into rotary motion that can then be usefully employed (e.g., driving the motion of the vehicle). Such shafts are held and supported by bearings that enable the rotation of the shafts during engine operation. During engine operation, these bearings and the shafts attached to them are subjected to fairly significant engine loads and therefore need to be adequately structurally supported.

While there is a need for structural support of the bearings that support the engine shafts, there are also engine design considerations (e.g., reduction in weight for improved fuel economy, reductions in material cost) that have led many modern engine blocks to be cast from aluminum or its alloys, when possible, rather than iron or its alloys. While utilizing aluminum helps to reduce weight, using an aluminum-based rather than an iron-based engine block often requires further supporting the regions receiving the bearings.

For cast aluminum engine blocks, it is often the case that supportive inserts, often made from cast iron, are cast into the aluminum engine block. These inserts provide increased strength and stiffness in the regions of bearing support when the cam shaft is bolted and engine loads are applied. As one particular example, for main bearing inserts ("MBI"), the insert might be formed from cast iron and then an aluminum alloy (typically an A380 aluminum alloy) is cast around the cast iron insert. During casting, the insert is mechanically locked in place with the cast material solidifying around portions of the geometry of the insert to retain the insert in position.

SUMMARY

Disclosed herein is an improved powder metal composition for forming bearing inserts which can be cast into aluminum or aluminum alloys in the production of engines. While conventional cast iron inserts rely on mechanical interlocking in which the aluminum or aluminum alloy is cast around geometric features of the insert, the disclosed ferrous sintered powder metal bearing insert has a microstructure in which copper is preferentially higher at the surface of the sintered powder metal insert. This increased amount of copper at the surface of the sintered powder metal insert enables the creation of a metallurgical bond upon contact with the aluminum casting material. To achieve increased copper at the surface of the insert to enable the formation of such a metallurgical bond during casting, the powder metal formulation of the ferrous insert can be carefully engineered such that a copper gradient develops during the fabrication of the powder metal insert that can be further exploited during casting.

According to one aspect, a powder metal alloy composition is disclosed for production of a sintered powder metal insert for casting into an aluminum casting. The powder metal alloy composition includes an iron powder metal base, copper added to the iron powder metal base such that the copper is 3.5 weight percent or more of the powder metal alloy composition, and carbon in an amount of 0.1 to 1.0 weight percent of the powder metal alloy composition. It is contemplated that the copper may be supplied as pre-alloyed copper in the iron powder metal base and/or an admixed copper-containing powder metal. Upon compacting and sintering the powder metal alloy composition to form the sintered powder metal insert, the sintered powder metal insert has a copper gradient that provides a higher concentration of copper on the surface of the sintered powder metal insert than in a center of the grains of the sintered powder metal insert.

In some forms of the composition, the admixed copper-containing powder metal may be elemental copper powder metal. This admixed copper-containing powder metal may also be non-ferrous (meaning that it could not be possibly characterized as pre-alloyed in the context of the ferrous composition).

In some forms of the composition, the copper present in the powder metal alloy composition may be partially pre-alloyed in the iron powder metal base and may also be partially in the admixed copper-containing powder metal that is admixed with the iron powder metal base. In such forms, the copper pre-alloyed in the iron powder metal base may be in an amount of 3 weight percent of the powder metal alloy composition and the copper in the admixed copper-containing powder metal may be in excess of 0.5 weight percent of the powder metal alloy composition. In still other forms, it is generally contemplated that the amount of copper pre-alloyed in the iron powder metal base may be 1, 2, or 3 weight percent of the powder metal alloy composition (with the remainder of the copper being supplied by the admixed copper-containing powder).

In some forms of the composition, the copper present in the powder metal alloy composition may include at least 3.5 weight percent copper that is provided in the form of the admixed copper-containing powder metal. It may be the case that all of copper added to the iron powder metal base is from the admixed copper-containing powder metal and there is no pre-alloyed copper in the iron powder metal base.

In some forms of the composition, the iron powder metal base may include, at least in part, the carbon therein.

According to another aspect, a sintered powder metal insert for casting into an aluminum casting is disclosed. The sintered powder metal insert includes a sintered body comprising any powder metal alloy composition described herein in which a plurality of particles of the powder metal alloy composition are sintered together to form the sintered body. The sintered body has a copper gradient which results in a higher concentration of copper on a surface of the sintered powder metal insert than in a center of the grains of the sintered powder metal insert. This gradient and increased amount of copper at the surface of the insert facilitate formation of a metallurgical bond with an aluminum casting material of the aluminum casting upon casting of the sintered powder metal insert into the aluminum casting material.

In some forms of the insert, the sintered body may include a pair of opposing ends on lateral sides thereof, a bearing-receiving surface positioned on a side of the body between the pair of opposing ends in which the bearing-receiving surface is adapted for reception of a bearing therein, and a pair of bolt holes extending through the body in an axial direction perpendicular to an axis of the bearing-receiving surface.

In some forms of the insert, a microstructure of the sintered body may include grains of ferrite, pearlite, and discrete MnS.

In some forms of the insert, a microstructure of the sintered body includes free copper. In those forms, at least some of the free copper in the microstructure may result from adjacent iron grains reaching their solubility limit of copper.

According to another aspect, a component is disclosed including the sintered powder metal insert as recited above and herein in which the sintered powder metal insert has been cast into the aluminum casting material and a metallurgical bond has been formed between the aluminum casting material and the copper in the sintered powder metal insert.

In some forms of the component, a microstructure of a region of the metallurgical bond between the copper at the surface of the sintered powder metal insert and the aluminum casting material may include a and el phases of Al—Cu.

In some forms of the component, the metallurgical bond may an interfacial layer comprising both aluminum and copper atoms intermixed with one another or diffused or disperse into one another.

According to another aspect, a method of forming a sintered powder metal insert and of forming a casting utilizing the insert are disclosed. The powder metal alloy composition disclosed above and herein is compacted and sintered to form a sintered powder metal insert (in which the powder metal alloy composition contains an iron powder metal base, copper added to the iron powder metal base in the form of a pre-alloyed copper in the iron powder metal base and/or an admixed copper-containing powder metal) such that the copper is 3.5 weight percent or more of the powder metal alloy composition, and carbon in an amount of 0.1 to 1.0 weight percent of the powder metal alloy composition. The sintered powder metal insert has a copper gradient that provides a higher concentration of copper on the surface of the sintered powder metal insert than in a center of the grains of the sintered powder metal insert.

In some forms of the method, the method further includes casting the sintered powder metal insert into an aluminum casting material to form an aluminum casting with the sintered powder metal insert cast therein in which copper at the surface of the powder metal insert forms a metallurgical bond with the aluminum casting material.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Disclosed herein is a ferrous powder metal composition that provides a metallurgical bond when the powder metal of the composition is compacted and sintered to provide an insert that is subsequently cast in an aluminum or an aluminum alloy. By adding copper to the ferrous powder metal in a sufficient amount and in a way to produce a microstructure having a copper gradient with high amounts of copper—or even free copper—at the powder surface of the compacted and sintered part, the resultant insert can be cast into an aluminum-based material and react with and form a metallurgical bond therewith. Thus, in contrast to conventional inserts, which may rely solely on mechanical bonding (e.g., macroscopic geometric engagement of the cast material solidifying around the insert), an even stronger metallurgical bond can be formed through this altering of chemistry.

Figure 1:
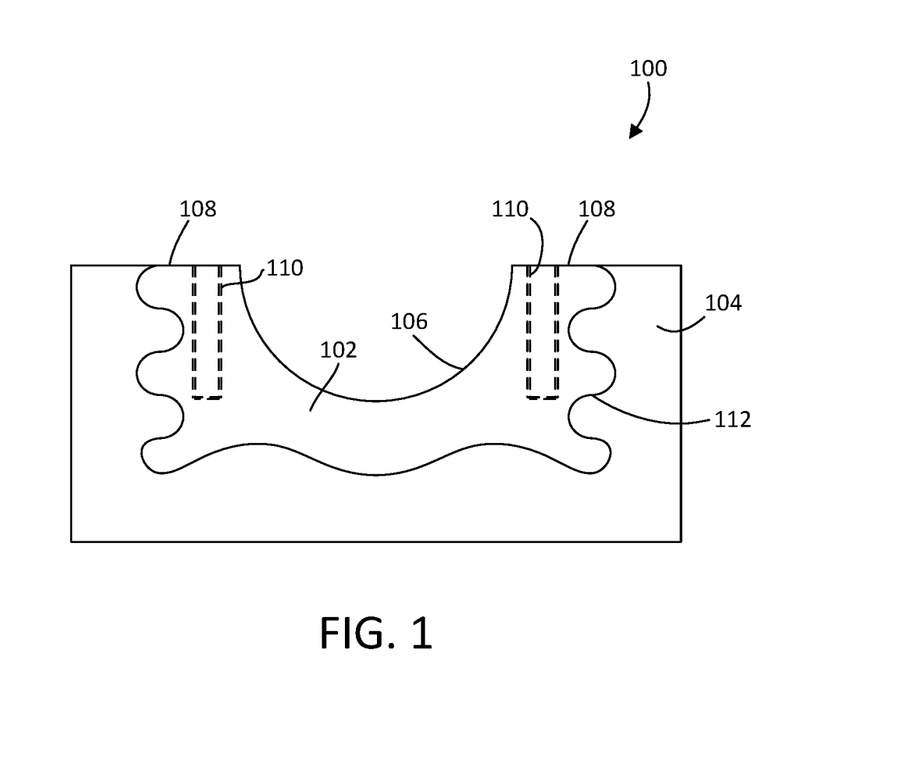
FIG. 1 is a side view of a cast component with a sintered powder metal insert cast therein.

FIG. 1 illustrates a side view an exemplary component 100 that may be formed by casting an insert 102 into an aluminum material 104. As illustrated, this component 100 can be one half of a bearing support for a bearing of a camshaft or crankshaft in an engine. As such, it has a bearing-receiving surface 106 in the form of a radially-inward facing semi-cylindrical surface that can be mated with a component having the other half of the radially-inward facing semi-cylindrical surface to capture a bearing therebetween in which the bearing might support a camshaft or crankshaft. The insert 102 also has a generally planar mating surface 108 that is positioned to contact the other component and two threaded holes 110 or bolt holes that extend in a direction perpendicular to the central axis of the bearing-receiving surface 106. When the mating surfaces of this component 100 and the mating component are placed together, these threaded holes 110 may be used to help secure the components together with bolts or other fasteners.

It is also noted that the insert 102 has an outer periphery 112 which, when the aluminum material 104 is cast around it, has a geometric shape that helps to maintain the mechanically secure the insert 104 in the aluminum material.

An insert such as insert 102 can be formed from a powder metal by taking a powder metal composition (typically, involving a plurality of individual particles and some amount of wax/lubricant, compacting the powder metal composition to form a preform having the rough geometric shape of the insert (typically, under uniaxial compression in a tool and die set), and then sintering the preform such that the individual particles neck into one another fuse together while reducing porosity. The compacting and sintering might occur separate and sequentially or might occur simultaneous with one another (e.g., as part of a powder forging step). During sintering as the preform is sintered to form the insert 102, the part densifies during the sintering process, with pores decreasing in size and closing off as the process continues. After the part is sintered, additional finishing or machining steps may occur such as, for example, the drilling or tapping of the holes 110 or the precise finishing of the dimensions of the bearing receiving surface 106.

To form the component 100 illustrated, the insert 102 is put in a form and an aluminum material is cast around the insert 102, typically an aluminum alloy (e.g., A380 which has copper between 3-4 wt %, magnesium of 0.1 wt %, maximum iron of 1.3 wt %, maximum tin of 0.35 wt %, maximum nickel of 0.5 wt %, zinc of 3 wt %, manganese of 0.5 wt %, silicon of 7.5-9.5 wt %, other metallic not exceeding 0.5 wt % total, with aluminum being the balance). While A380 is mentioned above because it is a well-known die casting aluminum alloy, A380 is representative but in no way limiting of the aluminum casting materials the might be used.

Notably, to enable reaction metallurgical bonding between a sintered powder metal insert 102 and the aluminum material 104 during casting, the powder metal alloy composition used to form insert 102 can be modified. It has been found that by the addition of appreciable amounts of copper to the ferrous powder metal composition used to make the insert, a copper gradient can develop, which leads to copper-rich surfaces of the insert 102 (with copper content either being high in the ferrous grains or copper being present as free copper), which can promote the formation of a reaction resulting in a metallurgical bond between the insert 102 and the aluminum material 104 with this metallurgical bond promoting an even stronger connection than the conventional mechanical bond that occurs during casting.

In order to promote the metallurgical bond between the insert 102 and the aluminum material 104, the copper in the ferrous powder metal is increased to an amount at or above 3.5 weight percent. This 3.5 weight percent copper exceeds the solid solubility limit of copper in grains of iron, and results in a copper gradient occurring, with higher copper amounts developing at the surface of the sintered powder metal particles and perhaps even the presence of free copper.

Accordingly, the powder metal alloy composition for production of a sintered powder metal insert for casting into an aluminum casting can include a plurality of powder metal particles including an iron powder metal base (i.e., grains of an iron powder metal which possibly including some or all of the copper and/or carbon), copper (pre-alloyed with the base powder and/or admixed) in an amount of 3.5 weight percent or more of the composition, and carbon in an amount of 0.1 to 1.0 weight percent of the composition to add additional strength. While the carbon need not necessarily be found as part of the iron powder metal base, it is contemplated that in most cases, the carbon will be present in the iron powder metal base. Upon compacting and sintering the powder metal alloy composition to form the sintered powder metal insert 102, the sintered powder metal insert 102 has a copper gradient that provides a higher concentration of copper on the surface of the sintered powder metal insert 102 than in a center of the grains of the sintered powder metal insert.

It is contemplated that the copper can be added to the iron powder metal base in the form of pre-alloyed copper in the iron powder metal base and/or in the form of an admixed copper-containing powder metal (which may simply be an elemental copper powder metal admixed with the iron powder metal base). Thus, in some forms, the copper present in the powder metal alloy composition can be partially pre-alloyed in the iron powder metal base and can be partially in the admixed copper-containing powder metal that is admixed with the iron powder metal base. In one form, 100% of the added copper to reach the 3.5 weight percent threshold may be from admixed copper-containing powder metal with no pre-alloyed copper at all being present in the iron powder metal base. It is contemplated that admixing copper at least some amount of the copper may be advantageous to developing a copper rich powder surface because admixing copper—as opposed to pre-alloying copper—can result in an increased copper gradient (as will be evident from the results in FIGS. 3B and 3C below).

For example, in some forms, the copper pre-alloyed in the iron powder metal base may be in an amount of 3 weight percent of the powder metal alloy composition and the copper in the admixed copper-containing powder metal may be in excess of 0.5 weight percent of the powder metal alloy composition. Likewise, it is contemplated that copper could be pre-alloyed in the iron powder metal based in amounts of, for example, 1, 2, and 3 weight percent of the powder metal alloy composition, with additional amounts of admixed copper being present to reach the 3.5 weight percent overall threshold (e.g., for 1 weight percent pre-alloyed, there would be at least 2.5 weight percent admixed)

Figure 2A:
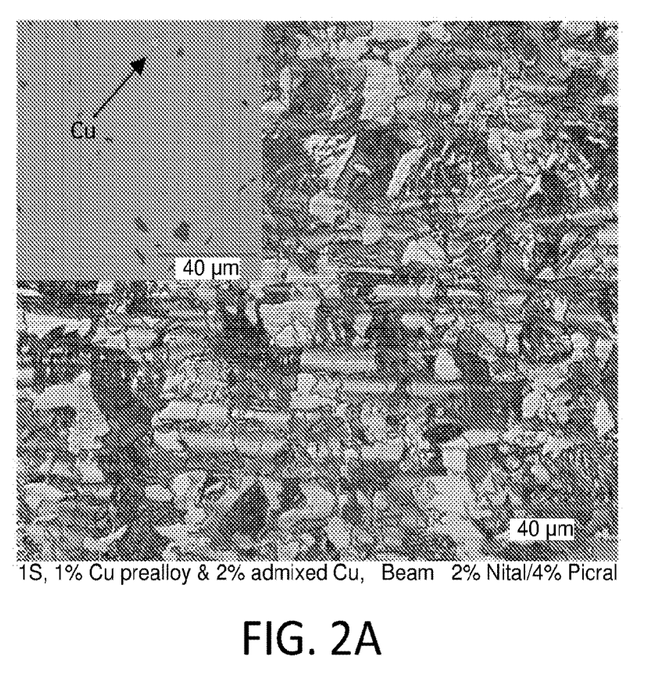
FIG. 2A-2C are a microstructure of a 3 weight percent copper ferrous microstructures in which the pre-alloyed amounts of copper are 1 weight percent, 2 weight percent, and 3 weight percent in FIGS. 2A, 2B, and 2C, respectively, with any remaining copper to reach 3 weight percent copper being in the form of admixed copper.
Figure 2B:
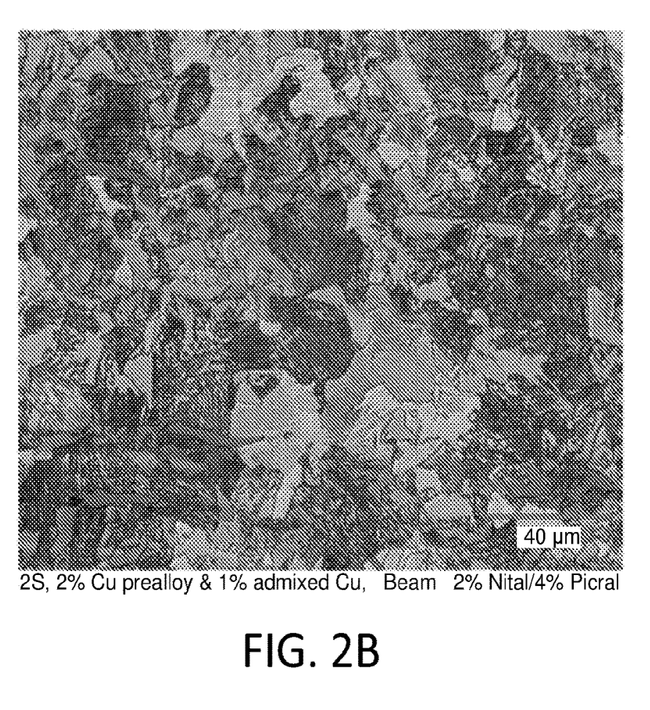
Figure 2C:
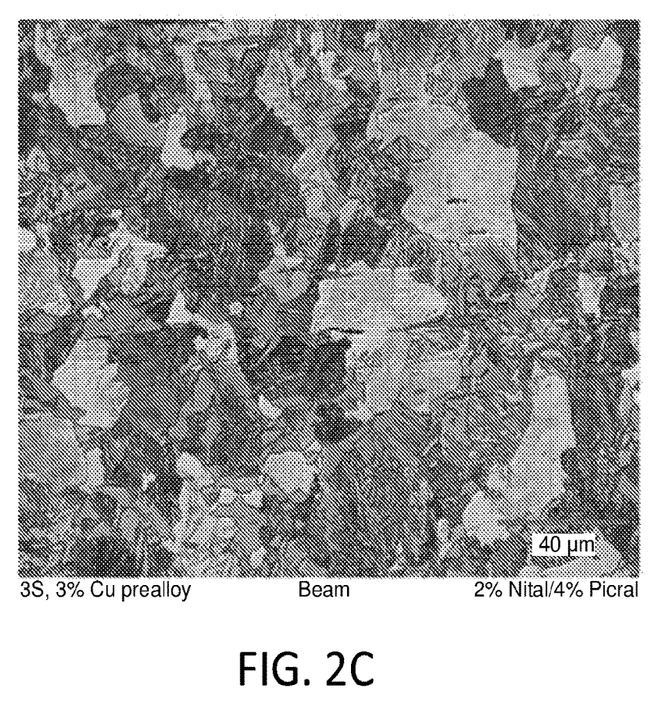

Referring now to FIGS. 2A-2C, microstructures of 1 weight percent pre-alloyed copper/2 weight percent admixed copper; 2 weight percent pre-alloyed copper/1 weight percent admixed copper; and 3 weight percent pre-alloyed copper after production forging trials. Again, for the sake of clarity, the pre-alloyed copper is pre-alloyed in an iron or ferrous powder metal. It can be seen that all of the 3 percent copper samples had ferrite, pearlite, and discrete MnS phases.

Figure 2D:
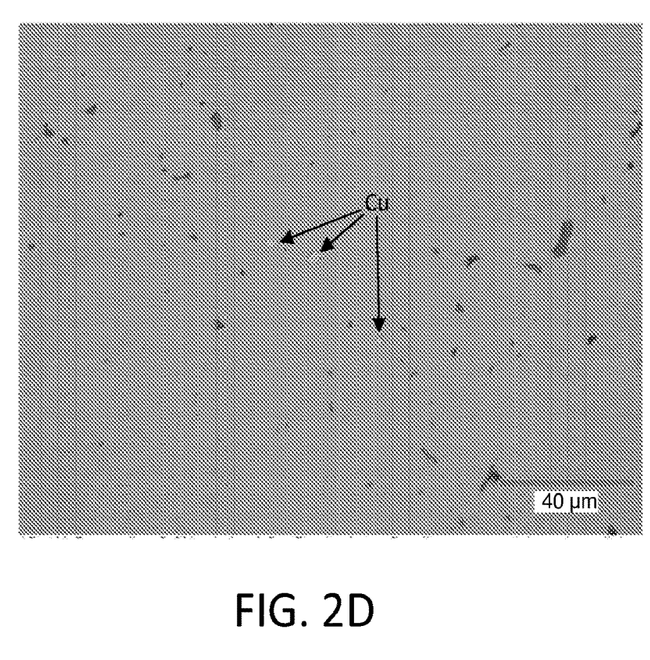
FIG. 2D illustrates some small amounts of copper in the 2 weight percent admixed sample with 1 weight percent copper pre-alloyed.

With reference to FIG. 2D, free copper is again present in the microstructure.

Figure 3A:
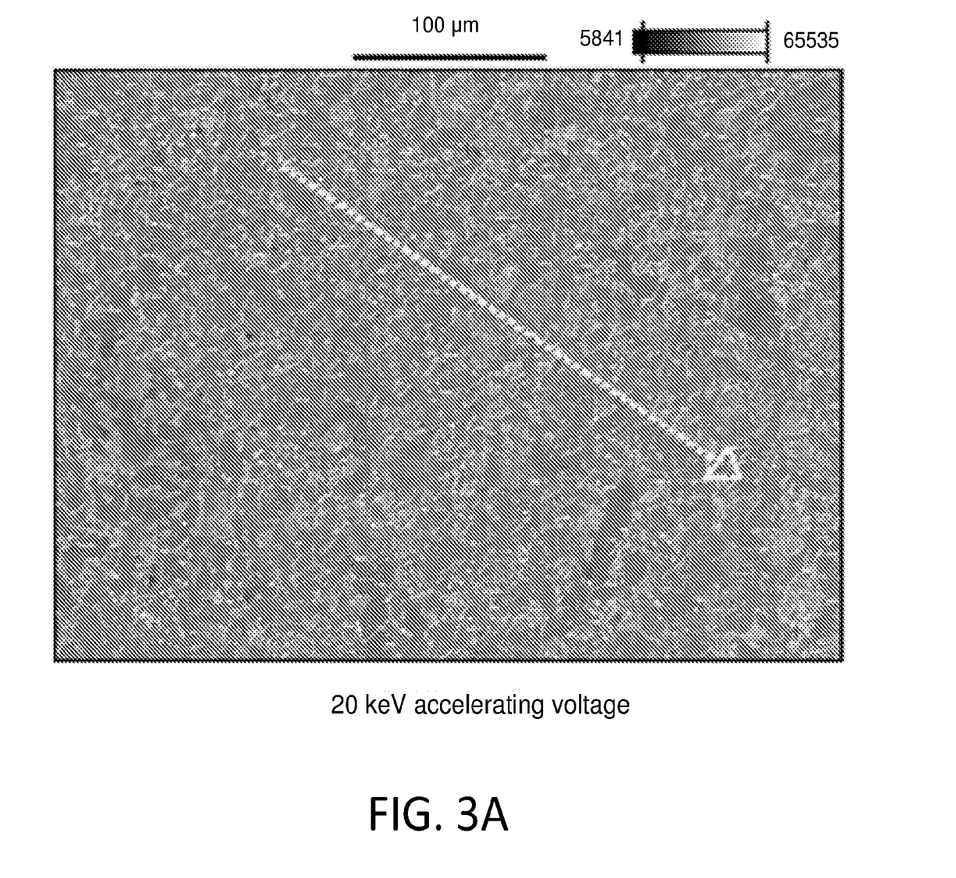
FIG. 3A is an exemplary micrograph of a sample illustrating a pathway along which copper concentration is measured in which the pathway traverses multiple grains.
Figure 3B:
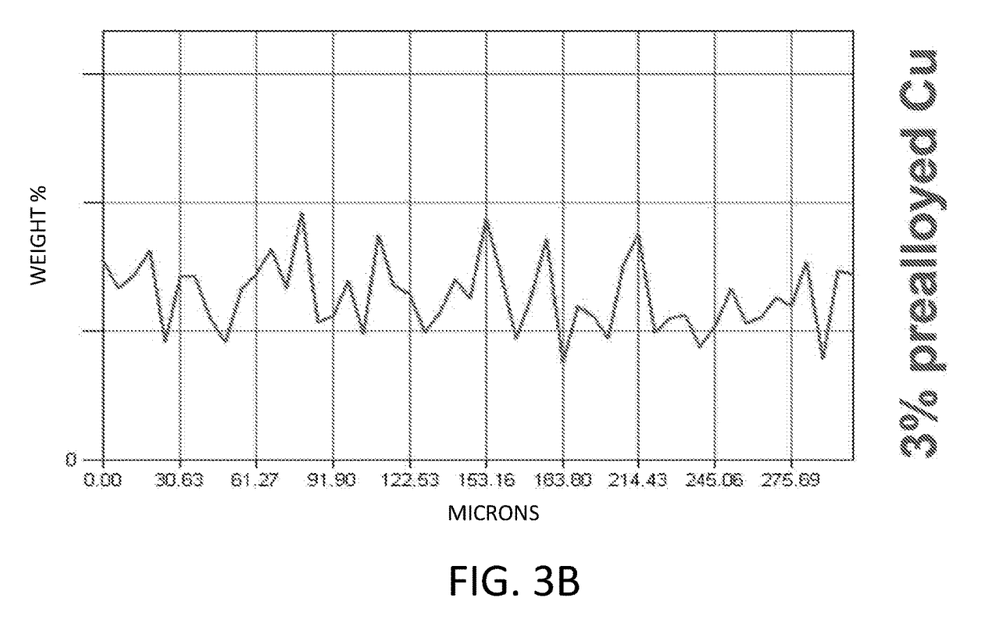
FIG. 3B illustrates a copper mapping line scan for 3 weight percent pre-alloyed copper.
Figure 3C:
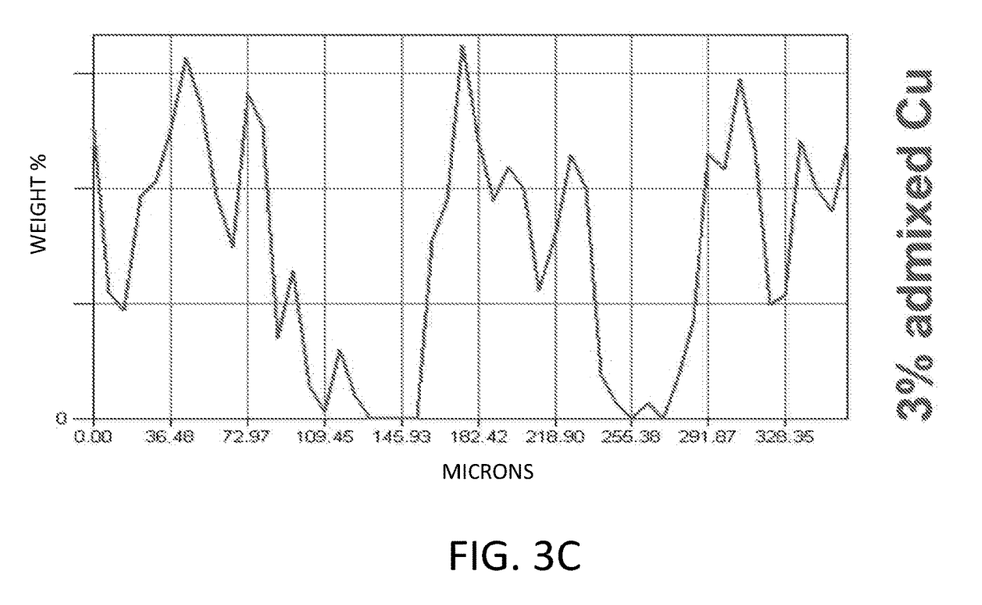
FIG. 3C illustrates a copper mapping line scan for 3 weight percent admixed copper.

Turning now to FIGS. 3A-3C, copper mapping was performed on some of the prepared samples to illustrate the copper distribution and gradient across the grains. FIG. 3A illustrates an example path for a line scan (which was performed using a JEOL JSM-6460LV SEM with EDX). This line scan was performed over a distance sufficient to cross multiple prior particles to show the relative uniformity. Sampling was performed at 7 micron increments.

FIG. 3B shows the copper mapping results for a 3 weight percent pre-alloyed sample, while FIG. 3C shows the copper mapping results for a 3 weight percent admixed copper sample. The relative homogeneity of the distribution of the copper in the pre-alloyed sample can be seen, as can be the significant peaks and troughs in the admixed copper sample (which represent copper rich surfaces of grains and copper-free regions of the center of the grains, respectively).

It is noted that admixing copper to an iron powder metal base already having 3 weight percent copper pre-alloyed, would result in a combined copper profile with high copper at the surfaces. This is because the solubility limit of copper in iron is around 4 weight percent and the admixed copper would not be able to appreciably diffuse into the pre-alloyed iron grains.

Figure 4:
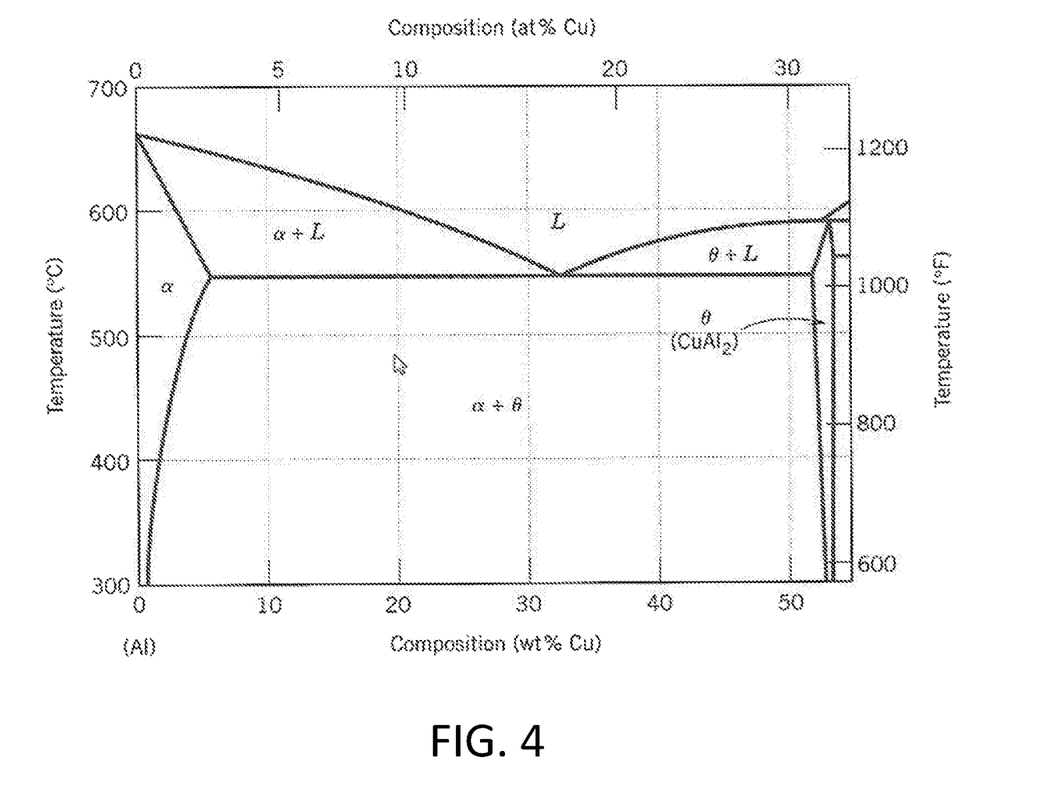
FIG. 4 is an aluminum-copper phase diagram.

Finally, turning to FIG. 4, an aluminum-copper phase diagram is shown. During casting, when the molten aluminum (or aluminum alloy) comes into contact with copper, some amount of the copper on the surface will dissolve into the aluminum. Given the rate of casting and cooling, it is contemplated that not all copper will dissolve into the aluminum liquid. This will create some localized regions of the aluminum liquid with low copper percentages. As the liquid Al—Cu melt cools, the α-phase will form and, depending on kinetics and dissolved copper composition, most likely, some amount of the α-phase plus θ-phase will form. This creates a localized region between the aluminum casting material and the copper, along which a metallurgical bond is created.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A sintered powder metal insert for casting into an aluminum casting, the sintered powder metal insert comprising:
    a sintered body comprising a powder metal alloy composition in which a plurality of particles of the powder metal alloy composition are sintered together to form the sintered body, wherein the powder metal alloy composition includes:
        an iron powder metal base;
        copper added to the iron powder metal base in the form of pre-alloyed copper in the iron powder metal base and an admixed copper-containing powder metal such that the copper is 3.5 weight percent or more of the powder metal alloy composition, wherein the copper present in the powder metal alloy composition is partially pre-alloyed in the iron powder metal base and is partially in the admixed copper-containing powder metal that is admixed with the iron powder metal base, and wherein the copper pre-alloyed in the iron powder metal base is in a range of 1 to 3 weight percent of the powder metal alloy composition; and
        carbon in an amount of 0.1 to 1.0 weight percent of the powder metal alloy composition;
    wherein, upon compacting and sintering the powder metal alloy composition to form the sintered powder metal insert, the sintered powder metal insert has a copper gradient that provides a higher concentration of copper on a surface of the sintered powder metal insert than in a center of the grains of the sintered powder metal insert to facilitate formation of a metallurgical bond with an aluminum casting material of the aluminum casting upon casting of the sintered powder metal insert into the aluminum casting material.

2. The sintered powder metal insert of claim 1, wherein the sintered body includes:
    a pair of opposing ends on lateral sides thereof;
    a bearing-receiving surface positioned on a side of the sintered body between the pair of opposing ends, the bearing-receiving surface being adapted for reception of a bearing therein; and
    a pair of bolt holes extending through the sintered body in an axial direction perpendicular to an axis of the bearing-receiving surface.

3. The sintered powder metal insert of claim 1, wherein a microstructure of the sintered body includes grains of ferrite, pearlite, and discrete MnS.

4. The sintered powder metal insert of claim 1, wherein a microstructure of the sintered body includes free copper.

5. The sintered powder metal insert of claim 4, wherein at least some of the free copper in the microstructure results from adjacent iron grains reaching their solubility limit of copper.

6. The sintered powder metal insert of claim 1, wherein the admixed copper-containing powder metal is elemental copper powder metal.

7. The sintered powder metal insert of claim 1, wherein the copper pre-alloyed in the iron powder metal base is in an amount of 3 weight percent of the powder metal alloy composition and the copper in the admixed copper-containing powder metal is in excess of 0.5 weight percent of the powder metal alloy composition.

8. The sintered powder metal insert of claim 1, wherein the copper present in the powder metal alloy composition includes at least 3.5 weight percent copper that is provided in the form of the admixed copper-containing powder metal.

9. The sintered powder metal insert of claim 1, wherein the iron powder metal base includes, at least in part, the carbon therein.

10. A component comprising the sintered powder metal insert of claim 1 in which the sintered powder metal insert has been cast into the aluminum casting material and a metallurgical bond is formed between the aluminum casting material and the copper in the sintered powder metal insert.

11. The component of claim 10, wherein a microstructure of a region of the metallurgical bond between the copper at the surface of the sintered powder metal insert and the aluminum casting material includes α and θ phases of Al—Cu.

12. The component of claim 10, wherein the metallurgical bond is an interfacial layer comprising both aluminum and copper atoms intermixed with one another.

13. The component of claim 10, wherein the aluminum casting material is an aluminum alloy.

14. A method comprising:
    forming the sintered powder metal insert of claim 1 by compacting and sintering the powder metal alloy composition.

15. The method of claim 14, further comprising the step of casting the sintered powder metal insert into an aluminum casting material to form an aluminum casting with the sintered powder metal insert cast therein in which copper at the surface of the powder metal insert forms a metallurgical bond with the aluminum casting material.

* * * * *

UNITED STATES PATENT AND TRADEMARK OFFICE
CERTIFICATE OF CORRECTION

Page 1 of 1

PATENT NO. : 11,794,240 B2
APPLICATION NO. : 16/768477
DATED : October 24, 2023
INVENTOR(S) : Ian W. Donaldson It is certified that error appears in the above-identified patent and that said Letters Patent is hereby corrected as shown below:

In the Specification

Column 3, Line 37, "a and el" should be --$\alpha$ and $\theta$--.

Signed and Sealed this
Twenty-sixth Day of December, 2023

Katherine Kelly Vidal
*Director of the United States Patent and Trademark Office*